United States Patent Office 3,481,984
Patented Dec. 2, 1969

---

3,481,984
METHOD OF PURIFYING CRUDE BIS(ORTHODI-AMINOPHENYL) COMPOUNDS
Donald E. Orgen, Westfield, and Arthur E. Prince, Jr., Chatham, N.J., and Robert Rozett, Charlotte, N.C., assignors to Celanese Corporation, New York, N.Y., a corporation of Delaware
No Drawing. Filed May 23, 1967, Ser. No. 640,520
Int. Cl. C07c 85/16, 87/50
U.S. Cl. 260—582                                    9 Claims

ABSTRACT OF THE DISCLOSURE

A method for the separation of unidentified water-insoluble colloid impurities from condensation polymer precursors, e.g.; crude diaminobenzidine (DAB). These highly organic impurities constitute from about 1 to 8 wt. percent of crude DAB and leave a largely iron oxide ash on burning. The purification is effected by preparing an aqueous solution of the crude precursor, preferably containing a flocculating agent; vigorously agitating the mixture under autogenous pressure; separating the fluocculated impurities, and recovering the purified compound from solution.

RELATED APPLICATION

The present application is closely related to an earlier patent by Celeste Michael Fontana and Anthony B. Conciatori, namely, U.S. Patent No. 3,390,180, Ser. No. 445,782 patented June 25, 1968, and of which the present invention is an improvement.

This invention relates broadly to the purification of crude precursors of condensation polymers. More particularly it is concerned with the purification of crude precursors (including crude monomers containing reactive amino groups) of linear condensation polymers consisting of recurring structural units containing aromatic nuclei and/or heterogeneous cyclic nuclei with or without intervening atoms or groups such as, for example, O, S, Se, —NH—, or divalent hydrocarbon radicals, for instance the various alkylene (including cycloalkylene), arylene, aralkylene and alkarylene radicals, etc. Still more particularly the invention is directed to the purification of crude precursors of polybenzimidazoles containing coagulable (e.g., water-insoluble, coagulable) impurities that have a detrimental effect upon the properties of a polybenzimidazole made from a precursor of such a polymer.

Specifically, the present invention is directed to certain new and useful improvements in the method of purifying the above-described crude precursors of polybenzimidazoles that is disclosed and claimed in the aforesaid, related Fontana et al. patent, the invention of Fontana et al. having a common ownership with that of the instant invention.

Taking a crude diaminobenzidine (DAB), e.g., 3,3′-diaminobenzadine, as illustrative of a precursor to be used as a reactant in making a linear condensation polymer, it may first be mentioned that this compound as commercially produced is a dark powder having a melting range of from about 167° C. to about 175° C. It was found that this crude material was entirely unsuitable for use in producing a high-molecular-weight polybenzimidazole. The reason for this was not immediately apparent nor could it be determined from a mere inspection of the material. The aforementioned invention of Fontana et al. was one solution of this problem.

In connection with a study of the problem, Fontana et al. gave consideration to the possibility that the difficulty might be due to the presence of some impurity in the crude product. Accordingly, analytical work was done in an effort to ascertain whether or not an objectionable impurity was present and, if so, the nature of that impurity. From the results of this analytical work its was found that the crude DAB contained an unidentified water-insoluble colloid high in organic matter. Fontana et al. found that the amount of this colloid ranged, for example, from about 5 to 10 percent by weight of the crude DAB, but which preesently ranges from about 1 to 8 weight percent. On burning it leaves an ash consisting mostly of iron oxide.

The problem was solved by Fontana et al., in accordance with one embodiment of their invention, by coagulating the above-described impurities in a liquid "solvent" (within which term is included liquid dispersion medium), e.g., water, in which the precursor is soluble but the impurities are insoluble.

After separating the coagulated impurities from the solution by any suitable means, e.g., filtration, centrifuging, or by siphoning, decanting or pumping off the supernatant liquor, etc., the purified precursor is isolated from the solution containing the same. Preferably the purified compound is isolated from the solution thereof after the solution has been contacted with a finely divided or granular decolorizing agent or adsorbent, e.g., activated carbons including boneblack, granulated charcoal, etc., activated alumina, activated bauxite, or any of the other available decolorizing (clarifying) agents. If water or an organic liquid, e.g., alcohol, mixed with a substantial amount of water should be used as the solvent, it will be understood, of course, by those skilled in the art that the chosen decolorizing agent should be one that is not appreciably degraded or changed in its physical structure by contact with water.

In the preferred purification technique of Fontana et al., the filtrate obtained after filtering off the coagulated colloid is collected in a steam-jacketed holding tank under a non-oxidizing (anerobic) atmosphere, more particularly an atmosphere of an inert gas, e.g., nitrogen, argon, helium, etc.; and all the ensuing processing steps are carried out under non-oxidizing conditions so as to prevent or minimize oxidative discoloration of the product.

Various means may be used to coagulate the coagulable, specifically water-coagulable, colloid. For instance, although not entirely satisfactory due to slower filtration rates, the colloidal impurity may be partly coagulated by boiling a dilute solution of the precursor material in water for several hours and then filtering the solution hot to separate the partly coagulated colloid.

In another and preferred embodiment of the invention of Fontana et al., and which is not the full equivalent of that hereinbefore described (especially that set forth in the preceding paragraph), the coagulable impurities are coagulated in a solution, more particularly an aqueous solution, to which has been added a small amount of a flocculating agent, more particularly such an agent which is at least partly soluble in water, and which is adapted to coagulate the colloidal impurities from "solution" (including colloidal solution and/or dispersion and/or true solution) state. Thereafter the impurities in coagulated state are removed from the solution.

Preferably after filtering off the coagulated colloid, the hot filtered solution is passed downwardly through a bed of granulated decolorizing agent or adsorbent, specifically granulated charcoal, e.g., having a particle size of 12/40 mesh (U.S. Standard Sieve Series). The filtrate is collected, and cooled to precipitate the purified DAB in the absence of air. After filtration, centrifuging or otherwise separating the DAB from the mother liquor, the purified DAB is dried under vacuum at or above ambient temperature (about 20°–30° C.). The thusly purified DAB is a white, crystalline material having a melting point of about 178°–179° C., and is now suitable for the production of high-molecular-weight polybenzimidazole (PBI).

In the method of Fontana et al. dissolution of the crude precursor of PBI (the precursor being specifically DAB) in water to which has been added a flocculating agent, specifically sodium chloride, is effetced at the boiling point of the aqueous solution (i.e., at the boiling point of water) under ambient pressure conditions. The weight concentration of crude precursor in water is "preferably from about 1% to about 3%."

In actual normal operating practice, when purifying DAB by the technique of Fontana et al., the concentration of DAB solids in the boiling water is at approximately the 2.0 weight percent level. At this concentration the tendency to form "cold spots" in the solution is critical in that the prematurely crystallized DAB does not readily go back into solution without vigorous agitation. This has been the cause of substantial and costly losses of material with extensive, costly "shut-down" time in production operations.

The present invention is based on our discovery that the foregoing difficulties can be obviated or minimized by effecting dissolution of the crude precursor in the aqueous solvent medium, specifically water, under autogenous pressure (i.e., at a temperature substantially above 100° C.) and while agitating the mixture. The temperature (i.e., maximum temperature) of effecting dissolution of the crude precursor, specifically DAB, may range, for example, from 105° C. to about 200° C., more particularly from a temeprature within the range of 105° or 110° C. as a lower limit to 120° or 125° C. as an upper limit of the liquid temperature during this step of dissolving the crude precursor. The time at the maximum temperature may range, for instance, from about 5 minutes to about 1 hour. (These time and temperature ranges are especially applicable when the solvent is water alone.) The overall periods of time, which include both the time required to attain maximum temperature and the time at the maximum temperature, are shorter at the lower maximum temperatures and are longer at the higher maximum temperatures. The time of heating under autogenous pressure should be kept to the minimum required to effect the dissolution of the crude precursor in the solvent and so that there is no substantial, if any, thermal degradation of the precursor.

The autogenous pressure (superatmospheric pressure) that is attained during dissolution of the crude precursor will vary with, for example, the vapor pressure of the aqueous solution at the particular elevated temperature employed, and this vapor pressure in turn is influenced by the kind and concentration of solids therein.

The improvement with which this invention is concerned makes possible the dissolution of a higher concentration of a precursor of PBI, specifically a diaminobenzidine, in an aqueous solvent, e.g., water alone or mixtures thereof with an organic solvent such as hereafter described. For example, whereas only about 2.5 weight percent of crude DAB is soluble in pure water at 100° C., the available data indicate that this percentage is increased to about 4% at 115° C., about 5.5% at about 117.5° C., and about 8% at 120° C. By getting more of the crude precursor into aqueous solution, the efficiency of the process is increased and made less costly since a lesser volume of solution need be handled per unit volume of purified precursor.

It has been mentioned hereinbefore that, in accordance with the preferred embodiment of the invention of Fontana et al., the coagulable impurities in the precursor of PBI are coagulated in solution, more particularly an aqueous solution, with the aid of a flocculating agent that is at least partly soluble in water.

Illustrative examples of flocculating agents that may be employed are soluble metallic salts, especially the water-soluble metallic salts, e.g., the alkali-metal (sodium, potassium, lithium, cesium and rubidium), ammonium, quaternary ammonium and amine salts of the halogen (chlorine, bromine, fluorine and iodine) acids; of the various phosphorus-containing acids, e.g., phosphorous, phosphoric, phosphonic, phosphinic, etc.; of the various sulfur-containing acids, e.g., sulfurous, sulfuric, toluenesulfonic, etc.; of the various nitrogen-containing acids, e.g., nitric, nitrous, etc.; of the aliphatic and halogenated aliphatic monocarboxylic and polycarboxylic acids, e.g., the $C_1$ through $C_{10}$ saturated aliphatic monocarboxylic acids, malonic, succinic, adipic, sebacic, suberic, glutaric, citric, tricarballylic, maleic, fumaric, itaconic, citraconic, mesaconic, aconitic, mono-, di- and trichloroacetic, and the various chlorinated propionic acids, etc.; aromatic mono- and polycarboxylic acids, e.g., benzoic, phthalic, terephthalic, isophthalic, etc.

Other examples of flocculating agents include the aluminum salts such as commercial or preferably highly pure alum; soluble ionic polymeric materials such as, for example, partly hydrolyzed polyacrylonitrile, partly hydrolyzed polyacrylamide, hydrolyzed copolymers of acrylonitrile and acrylamide, and hydrolyzed copolymers of acrylonitrile and/or acrylamide with one or more other copolymerizable monomers containing an ethylenic linkage, e.g., at least one, and preferably a single, $CH_2=C<$ grouping, e.g., vinyl acetate, maleic acid, allyl alcohol, acrylic acid, acrylic and methacrylic esters such as the methyl through lauryl esters of the said acids, and the salts, especially the alkali-metal, ammonium, quaternary ammonium and amine salts of the aforementioned polymers.

When the lightness of color of the purified precursor is important, it will be understood by those skilled in the art that it is generally desirable to avoid flocculating agents that may discolor or tend to discolor the purified precursor or polymer made therefrom.

The flocculating agent may be used in finely divided state if it is normally a solid, or it may be added to the solvent (e.g., aqueous solvent) solution of the precursor in the form of a concentrated solution. Preferably it is added to the solvent, as by dissolution therein, in the desired amount prior to dissolving (or dispersing) the crude precursor therein.

Only a relatively small amount of flocculating agent is required. In some cases it may be as low as from 5 to 500 weight parts thereof per million weight parts of the solvent solution of the crude precursor; or it may be up to, for instance, 0.5 or even 1 or more weight percent of the said solution of the precursor to be purified. For economical reasons obviously no more of the flocculating agent should be used than is necessary to produce the desired results.

The amount of crude precursor in the liquid medium in which it is dissolved with agitation under autogenous pressure can be varied considerably by increasing the temperature and, therefore, the vapor pressure attained in effecting dissolution. When the liquid solvent medium is water alone, the concentration of crude precursor in weight percent of the solution may be varied, for example, from about 2% to about 10% at temperatures within the range of from about 105° C. to about 125° C. corresponding to gauge pressures (i.e., total pressure) of from about 2 p.s.i.g. to about 25 p.s.i.g. These pressures will vary slightly depending upon the kind and amount of flocculating agent that also is preferably present in the aqueous solution As indicated hereinbefore, the use of temperatures up to about 200° C. is not precluded since higher concentrations are attained at the higher temperatures; however, the resulting higher autogenous pressures necessitate the use of more costly equipment. Still higher concentrations of crude precursor, specifically crude DAB, can be obtained by effecting the dissolution technique hereinbefore described using as the liquid solvent medium a mixture of water and an organic solvent.

Water alone is the preferred liquid medium in which the crude precursor is dissolved or dispersed. However, as indicated above, mixtures of water and organic solvents also can be used in volume percentages ranging, for instance, from 10:90 of the one to 90:10 of the other, and specifically about 50:50 volume percent of each.

Examples of organic solvents that may be used admixed with water as the liquid medium are various monohydric and polyhydric alcohols, e.g., methyl, ethyl, propyl and butyl alcohols (both normal and isomeric forms); and glycols; e.g., ethylene glycol, etc. Other examples include hydroxyketones, e.g., diacetone alcohol (4-hydroxy-4-methyl-2-pentanone); and ether-alcohols, e.g., the monomethyl and mono-ethyl ethers of ethylene glycol and of diethylene glycol, and the diethyl ether of diethylene glycol. Preferably the organic solvent employed in such a combination with water is one that boils below about 200° C. and more preferably, below about 150° C.

The present invention is believed to be broadly applicable to the purification of crude precursors of the kind described in the second sentence of the paragraph of this specification that follows the paragraph under the heading "Related Application," and more particularly to such precursors that can be dissolved (and/or dispersed) in water alone or admixed with an organic solvent and which contain coagulable (including water-insoluble, coagulable) impurities that have a detrimental effect upon the properties of a linear condensation polymer made from such a precursor. The invention is specifically applicable to crude precursors of a polybenzimidazole, which precursors have the aforementioned characteristics.

Illustrative examples of crude precursors that may be purified in accordance with this invention are precursors having the aforementioned characteristics and being compounds having formulas selected from the group consisting of A 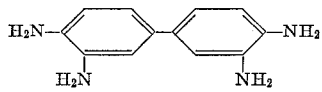

and

B 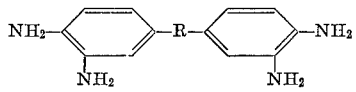

where R represents an intervening atom or group such as, for example, O, S, Se, —NH—, or divalent hydrocarbon radicals, for instance the various alkylene (including cycloalkylene), arylene, aralkylene and alkarylene radicals, etc.

Illustrative examples of divalent hydrocarbon radicals represented by R are the divalent aliphatic (including cycloaliphatic) hydrocarbon radicals, e.g., methylene, ethylene, propylene through dodecylene (both normal and isomeric forms, and higher members of the homologous series if desired), cyclopentylene, cyclohexylene, cycloheptylene, etc.; divalent aromatic hydrocarbon radicals, e.g., phenylene, naphthylene, etc.; divalent aliphatic-substituted aromatic hydrocarbon radicals, e.g., 2,4-tolylene, ethyl-2,5-phenylene, isopropyl-3,4-phenylene, 1-butyl-2,4-naphthylene, etc.; divalent aromatic-substituted aliphatic hydrocarbon radicals, e.g., phenylethylene, phenylpropylene, naphthylisobutylene, xylylene, alpha-(4-tolylene)-beta'-butyl, etc.; and radicals that may be classed as either divalent aromatic-substituted aliphatic or divalent aliphatic-substituted aromatic hydrocarbon radicals, e.g., 4-alpha-tolylene, 3-beta-phenylenethyl, 4-alpha-xylene, 2-gamma-phenylenebutyl, etc. Thus, the divalent hydrocarbon radicals represented by the aforementioned R may be one represented by the formula —Ar—R'—Ar— where Ar represents an arylene radical and R' represents an alkylene radical.

In cases where possible polymerization through, or other reaction through or at a double-bonded carbon atom in an aliphatic chain are unobjectionable during use of the precursors in forming a linear condensation polymer, the divalent hydrocarbon radical represented by R may be a divalent ethylenically-unsaturated aliphatic hydrocarbon radical, e.g., propenylene, isopropenylene, butenylene, cyclopentenylene, cyclohexenylene, etc.; or the ethylenic unsaturation may be in the aliphatic chain of a divalent aliphatic-substituted aromatic hydrocarbon radical as in, for example, allyl-2,5-phenylene; or in the aliphatic chain of a divalent aromatic-substituted aliphatic hydrocarbon radical as in, for instance, phenylpropenylene.

When the crude precursors is one embraced by Formula B, supra, we prefer that R in the said formula be a divalent hydrocarbon radical containing not more than 3 carbon atoms, more particularly a divalent saturated aliphatic hydrocarbon radical containing not more than 3 carbon atoms.

In addition to precursors of high-melting polybenzimidazoles such as those described above by way of illustration, the process of the present invention also may be used in purifying crude precursors of other high-melting linear condensation polymers, more particularly the polyimides, e.g., poly-[N,N'-(p,p'-oxydiphenylene)pyromellitimide], the polybenzothiazoles, e.g., poly-[2,2'-(1,3-phenylene)-6,6'-bibenzothiazole], and the polyquinoxalines, e.g., poly-[2,2'-(1,4-phenylene)-6,6'-biquinoxaline].

In order that those skilled in the art may better understand how the present invention can be carried into effect, the following examples are given by way of illustration and not by way of limitation. All percentages are by weight.

EXAMPLE 1

The first part of this example is substantially the same as Example 1 of the aforementioned Fontana et al. patent.

A. A glass column of 30 mm. internal diameter is provided with a bottom filter plate having a very fine porosity, a bottom flow control and a steam-heated jacket. The column is packed to a depth of 59 cm. with pre-boiled, dust-free, 12/40 mesh activated carbon. An ice-cooled, nitrogen-filled receiver is also provided.

A slurry containing about 2.7 wt. percent crude 3,3'-diaminobenzidine (DAB) in water is prepared, boiled (at atmospheric pressure) from 3 to 4 hours whereby the colloidal impurity in the DAB is partially coagulated, and filtered hot (with considerable difficulty) through fine-porosity filter paper. The hot, clear solution is passed through the carbon-packed column at the rate of from 1 to 2 liters per hour. After initially saturating the column, there is obtained in the above-described receiver white, crystalline DAB having a melting point of 178°–179° C.

B. Essentially the same procedure is followed as described under the A portion of this example with the exception that the slurry of DAB in water contains about 3.6 wt. percent of crude DAB. The slurry is prepared in a steam-jacketed, stainless steel pressure vessel provided with a mechanical agitator. In this vessel the charge is heated to 122°–125° C. with agitation, and it is maintained at this temperature for 1 hour under an autogenous pressure of about 16–19 p.s.i.g. while continuing the agitation. No premature crystallization of the DAB occurs during hot filtration to separate the partially coagulated impurities, or during decolorization by passing the hot filtrate through a column of 12/40 mesh activated carbon.

The procedures of both the A and B portions of this example have the disadvantages that the filtration step is slow and difficult, often requiring that the filter be changed, and these disadvantages add greatly to the cost of the purification step.

EXAMPLE 2

To a stainless-steel, steam-jacketed vessel provided with a mechanical agitator, and having a nominal capacity of 200 gallons, are charged 50 pounds of crude DAB, 200 grams of NaCl and 167 gallons of demineralized water.

The DAB constitutes about 3.6 weight percent of the solution. While agitating the mixture the charge is heated to 122°–125° C., and maintained for 20 minutes within the said temperature range under an autogenous pressure of 16–19 p.s.i.g. If and when desired or required, for instance when a safety valve is leaking or for any other reason, nitrogen gas ($N_2$) or other inert gas can be charged to the vessel in order to maintain a desired minimum pressure, e.g., about 19 p.s.i.g.

At the end of the dissolution period under autogenous pressure, the solution is pumped while still under pressure through a filter to remove the insoluble impurities. The filtrate is clear, and light brown to amber in color. It is stored in a steam-jacketed holding tank under nitrogen.

Beginning with the holding tank, all the ensuing processing equipment is kept under an inert atmosphere, specifically nitrogen, to prevent oxidative discoloration of the product.

From the holding tank the hot solution, still under pressure, is passed downwardly through an adsorption tower or column charged with a decolorizing (clarifying) agent, specifically a bed of 80 pounds of activated carbon of 12/40 mesh particle size and which previously has been charged with purified DAB.

The clarified solution is vented from the adsorption tower into a 200-gallon, stainless-steel, water-cooled vessel (crystallizer) previously purged of all oxygen. The vessel is provided with an agitating mechanism, the parts of which that come in contact with the solution being coated with polytetrafluoroethylene as are also the inner walls of the vessel. The solution is cooled to 25° C. in this crystallization unit while agitating the mass whereupon the purified DAB crystallizes from solution. The slurry of purified DAB crystals in water is centrifuged to isolate the crystalline product.

The DAB crystals are then dried in vacuo at 100° C. for 4 hours. The content of volatile material in the dried product is less than 0.1%. There is recovered 42.6 pounds of white, crystalline DAB corresponding to a yield of 92.5% based on 92% purity of the crude DAB. The product is obtained without any premature crystallization of the DAB from solution prior to the final crystallization of the product from solution in the crystallization unit.

EXAMPLE 3

Example 2 is repeated with the exception that, instead of crude 3,3′-diaminobenzidine, there is used in individual runs one of the following crude bis(diaminophenyl)-alkanes which, in substantially pure state, are precursors useful in making high-molecular-weight polybenzimidazoles:

1,2-bis(3,4-diaminophenyl)ethane
2,2-bis(3,4-diaminophenyl)propane

Similar results are obtained.

EXAMPLE 4

Example 2 is repeated with the exception that, instead of using sodium chloride as the flocculating agent, there is employed in individual runs an equivalent amount (approximately 170–230 grams) of one of the following flocculating agents:

Potassium chloride
Sodium sulfate
Sodium nitrate
Sodium trichloroacetate

Similar results are obtained.

Instead of the specific flocculating agents used in Examples 2 and 4, one may employ any other suitable flocculating agents, numerous examples of which have been given hereinbefore. Preferably an alkali-metal chloride and specifically sodium chloride is employed.

From the foregoing description it will be seen that the present invention is concerned with a particular improvement in a method of purifying a crude precursor compound, e.g., a crude bis(ortho-diaminoaryl) precursor compound, containing water-insoluble coagulable impurities that have a detrimental effect upon the properties of a condensation polymer made therefrom. Such a method includes the purification of a precursor selected from compounds having formulas of the group consisting of those set forth opposite A and B, supra, e.g., 3,3′-diaminobenzidine, and wherein the method comprises admixing a hot aqueous solution of the said precursor and a flocculating agent, e.g., a metallic halide, more particularly an alkali-metal chloride or other halide. The flocculating agent is present in an amount sufficient to coagulate the water-insoluble (more particularly water-insoluble colloidal) impurities. The coagulated colloid is then removed by suitable means, e.g., by hot filtration. The hot filtrate is preferably decolorized (clarified) under anerobic (non-oxidizing) conditions, and the decolorized filtrate is cooled, preferably under nonoxidizing conditions, to deposit crystals of purified precursor compound from the mother liquor.

In a more specific embodiment of the method to which the present improvement is applicable and which is concerned with the purification of crude 3,3′-diaminobenzidine to remove water-insoluble colloidal impurities therefrom, said method comprises dissolving the aforementioned diaminobenzidine in hot water containing sodium chloride in an amount effective in coagulating the aforementioned impurities; filtering the resulting solution, while hot, to remove the coagulated impurities therefrom; decolorizing (clarifying) the hot filtrate, preferably under non-oxidizing conditions, by percolation filtration through a bed of granular decolorizing (clarifying) agent; cooling the decolorized filtrate, preferably under non-oxidizing conditions, to deposit crystals of purified 3,3′-diaminobenzidine from the mother liquor; separating the deposited crystals from the mother liquor; and drying the separated crystals at an elevated temperature under non-oxidizing conditions, e.g., under vacuum.

The improvement of this invention is in a method of the kind hereinbefore described and, also, in the aforementioned Fontana et al. application and consists in effecting dissolution of the crude precursor to be purified under autogenous pressure, more particularly autogenous pressure corresponding to a maximum liquid temperature below the softening point of the pure precursor, said temperature preferably not exceeding about 200° C., and said dissolution being effected while agitating the admixture. In a more preferred embodiment of the improvement, especially when the crude precursor to be purified is 3,3′-diaminobenzidine, the autogenous pressure employed corresponds to a liquid temperature within the range of from 105° C. to about 125° C.

It is to be understood that the foregoing detailed description is given merely by way of illustration and that variations may be made therein without departing from the spirit of the invention.

The embodiments of the invention in which an exclusive property or privilege is claimed are defined as follows:

1. The method of purifying a crude bis(orthodiaminophenyl) compound comprising forming a dilute aqueous solution of said precursor and a minor amount, as compared to the amount of said crude precursor, of a soluble flocculating agent selected from the group consisting of soluble metallic salts and soluble ionic polymeric materials and their salts; separating the flocculated material from said solution; and thereafter isolating the purified compound from said solution; the improvement which consists in effecting dissolution of the crude bis(orthodiaminophenyl) compound in the aqueous solvent under autogenous pressure corresponding to liquid temperatures of from about 105° C. to about 200° C.

2. In a method as in claim 1 wherein the crude bis-(orthodiaminophenyl) compound is a crude diaminobenzidine.

3. The improvement in a method as in claim 2 wherein the flocculating agent is a water-soluble metallic salt.

4. The improvement in a method as in claim 3 wherein the flocculating agent is an alkali-metal halide.

5. The improvement in a method as in claim 4 wherein the flocculating agent is sodium chloride.

6. The improvement in a method as in claim 1 wherein the crude precursor is selected from compounds having formulas of the group consisting of A 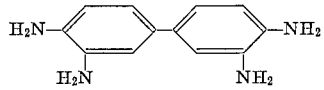

and

B 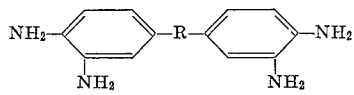

wherein R represents a divalent hydrocarbon radical; the coagulable impurities are coagulated in water to which has been added a minor amount, as compared to the amount of said crude compound, of a flocculating agent selected from the group consisting of soluble metallic salts, and soluble ionic polymers and their salts; the coagulated colloidal impurities are removed by hot filtration, the hot filtrate is decolorized under non-oxidizing conditions; the decolorized filtrate is cooled under non-oxidizing conditions to deposit crystals of purified precursor compound from the mother liquor; and the crystals are isolated from the mother liquor.

7. The improvement as in claim 6 wherein the crude precursor is crude 3,3'-diaminobenzidine, and the flocculating agent is an alkali-metal chloride.

8. The improvement in a method as in claim 2 wherein the crude precursor is crude 3,3'-diaminobenzidine; the coagulable impurities are coagulated in water to which has been added sodium chloride in an amount effective in coagulating the said impurities; the resulting solution is filtered, while hot, to remove the coagulated impurities therefrom; the hot filtrate is decolorized by percolation filtration through a bed of granular decolorizing agent; the filtrate is cooled under non-oxidizing conditions to deposit crystals of purified 3,3'-diaminobenzidine from the mother liquor; the deposited crystals are separated from the mother liquor; the separated crystals are dried at an elevated temperature under non-oxidizing conditions; and the improvement consists in effecting dissolution of the crude 3,3'-diaminobenzidine precursor in water containing the aforesaid sodium chloride under autogenous pressure corresponding to a liquid temperature within the range of from about 110° C. to about 125° C. and while agitating the mixture.

9. The improvement as in claim 8 wherein the decolorizing agent is granular activated carbon that had previously been saturated with purified 3,3'-diaminobenzidine.

References Cited

UNITED STATES PATENTS 3,390,180   6/1968   Fontana et al. _____ 260—582

CHARLES B. PARKER, Primary Examiner

R. L. RAYMOND, Assistant Examiner

U.S. Cl. X.R.

260—304, 309.2, 570, 571, 576, 704